UNITED STATES PATENT OFFICE.

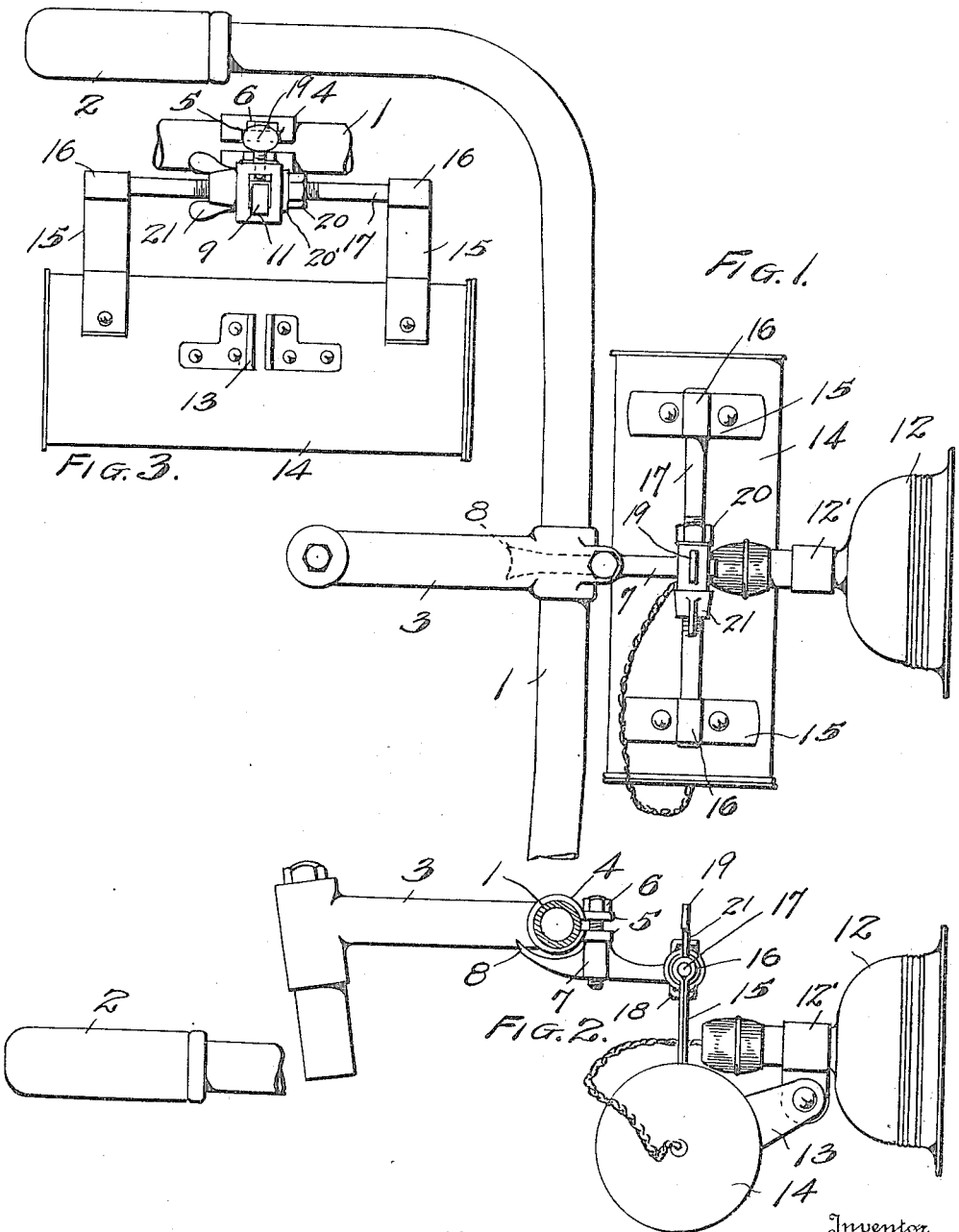

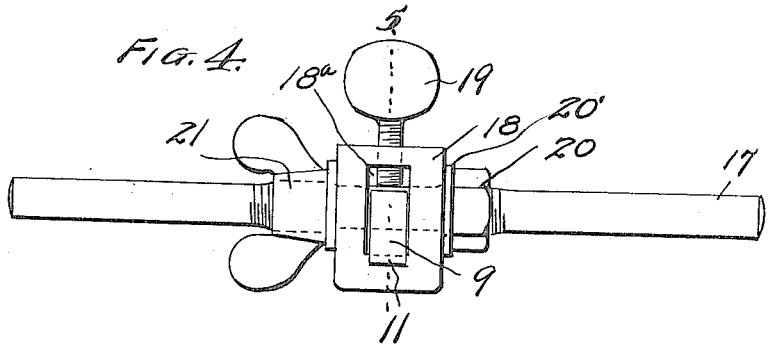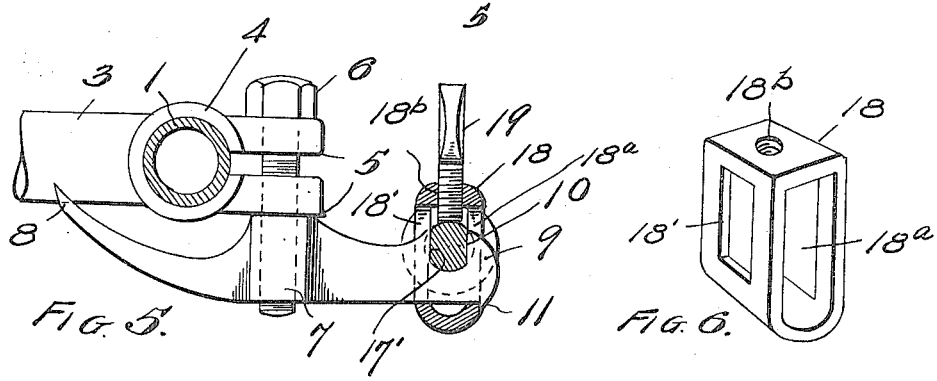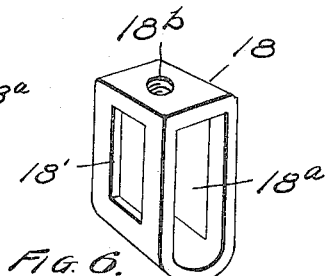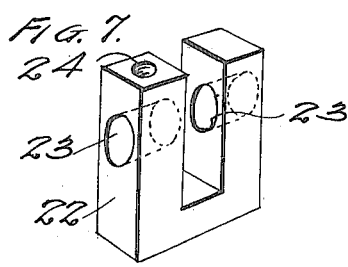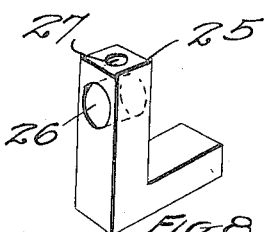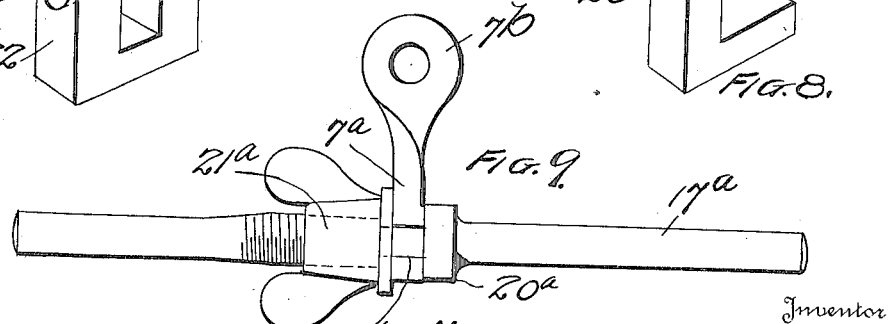

NICHOLAS WATT SHIPP, OF SALEM, OREGON.

LAMP-SUPPORT.

1,206,263.  Specification of Letters Patent.  Patented Nov. 28, 1916.

Application filed January 10, 1916. Serial No. 71,283.

*To all whom it may concern:*

Be it known that I, NICHOLAS WATT SHIPP, a citizen of the United States of America, residing at Salem, in the county of Marion and State of Oregon, have invented new and useful Improvements in Lamp-Supports, of which the following is a specification.

My present invention relates to improvements in lamp supports, and is designed particularly for use in connection with bicycles, motorcycles, etc.

The primary object of the invention is the provision of a supporting device by which an electric lamp, preferably of the self contained variety, may be detachably but rigidly suspended from the handle bars of a bicycle or motorcycle, in such manner that the construction of the handle bars is not altered; in which the lamp may be adjusted to various desired positions; and further the objects of the invention are to provide a comparatively inexpensive but efficient device for performing the functions required of a perfect support of this character.

The invention consists essentially in certain novel combinations and arrangements of parts for supporting the lamp as will be hereinafter more fully specified and claimed.

In the accompanying drawings I have illustrated one complete example, and several modifications of the physical embodiment of my invention, constructed according to the best mode I have so far devised for the practical application of the principles of my invention.

Figure 1 is a top plan view, broken, showing the handle bars of a bicycle or motorcycle and a lamp supporting device and lamp attached thereto, according to my invention. Fig. 2 is an edge view of the lamp and its support in Fig. 1 showing the handle bar in cross section. Fig. 3 is a front elevation, with the lamp omitted showing the battery casing and support. Fig. 4 is a front view, enlarged of the lamp support, detached. Fig. 5 is a sectional view at line 5—5 of Fig. 4. Fig. 6 is a perspective view showing a locking yoke of the support. Fig. 7 is a perspective view of a modified yoke. Fig. 8 is a perspective view of a further modified yoke. Fig. 9 is a top plan view showing a supporting bar, a modified form of locking device and a modified form of supporting bracket.

While I shall hereinafter refer to the lamp support in connection with a motorcycle handle bar as illustrated in my drawings, it will of course be understood that the supporting device is equally applicable for use in other relations, and further it will be understood that forms of lamps other than that shown in my drawings may be utilized in connection with the support.

In the preferred embodiment of my invention as illustrated in the accompanying drawings I exemplify the invention in connection with the handle bar 1 and handles 2 of standard form and type attached to the handle bar extension 3 by means of the resilient clamp 4 including the spaced lugs 5 perforated for the clamp bolt 6 by means of which they are drawn together and the clamp rigidly fixed about the handle bar, as used in well known manner.

In connection with the handle bar and its clamp I utilize a bracket 7 which is threaded to receive the bolt 6 and has a foot 8 adapted to frictionally engage the under side of the extension 3 to hold the bracket in rigid position when screwed to the clamp of the handle bar by the bolt 6 which is passed through the bracket 7. At its opposite end the bracket is formed with a head 9 formed with an open slot 10 at its upper side, and fashioned with a hook or shoulder 11 below the slot. This bracket is adapted to support a lamp as 12 illustrated as attached by means of the sleeve 12′ and perforated ears 13 to the battery casing 14 in which an electric battery is carried to supply the electric lamp 12. The casing is equipped with a pair of posts 15 which may well consist of metallic plates attached to the casing and bent upon themselves to form sleeves 16 in which the supporting bar 17 is rigidly fixed, and by means of a yoke 18 the bar is coupled to the bracket.

The yoke 18 may be made in various different shapes, one of the preferred forms being illustrated in Fig. 6 wherein a substantially rectangular, hollow casting is shown, open at its ends and provided with a front slot 18$^a$, a rear slot 18′ and a top threaded opening or perforation 18$^b$. This yoke is adapted to slip over the end of the supporting bar 17 (before it is attached or fixed to the sleeves 16) and is held in place on the bar by means of the set screw 19 threaded through the opening 18$^b$ in the yoke. In Fig. 5, it will be seen with especial clearness that the head of the bracket is passed through the slots 18' and 18ª of the yoke and the bottom edge of the bracket rests upon the lower walls of the slots in the yoke, the hook or shoulder 11 of the bracket engaging over the edge of the wall of slot 18ª. By means of the screw 19 it will be seen that the yoke, bar and bracket are rigidly held together, and to insure against possibility of the bar turning, it may be flattened at 17' so that it fits neatly in the open slot 10 of the head 9. At each side of its center, or flattened portion of the supporting bar, it is threaded to accommodate the lock nut 20 and the winged clamping nut 21, and these nuts, one located at each side of the yoke together with the washer 20' are designed to clamp the yoke on the bar against lateral movement.

The operation and use of the support will be evident from the drawings, it being understood that the bracket arm is first attached, by preference, to the handle bars of the bicycle, then with the yoke loosely retained on the bar, the yoke is passed over the head of the fixed bracket 7, and the flattened portion of the bar with the yoke is inserted in the slot 10 of the bracket head. The screw or bolt 19 is then turned home and the yoke is clamped on the bar, after which the two nuts 20 and 21 are turned tight against the washer and end of the yoke and the whole device is thus quickly and with facility attached to the handle bars, and with equal facility and despatch it will readily be seen that the parts may be detached when desired.

In Fig. 7 a modified form of yoke is indicated at 22 provided with openings 23 to slip over the bar 17 and formed with a threaded opening 24 for the set screw 19. A further modified yoke 25 is illustrated in Fig. 8 in which the yoke is of L-shape and formed with an opening 26 for the bar 17 and a vertically extending opening 27 for the set screw 19.

In Fig. 9 the bar 17ª is formed with an integral annular shoulder 20ª to take the place of the nut 20 and the winged clamping nut 21ª firmly holds the bar attached to the bracket 7ª which is flattened at 17ᵇ to fit into the open slot of the bracket head.

These and other modifications of parts of the device I contemplate making and using, as they are within the scope of my claims and come within the spirit of my invention.

What I claim is:—

1. The combination with a supporting bracket and a supporting bar for a lamp, of a yoke on the bar adapted to fit over the bracket, means for clamping the yoke, bracket and bar together, and means for clamping the yoke against lateral movement on the bar.

2. The combination with a slotted bracket and a supporting bar seated therein, of a yoke fitted over said bar and bracket and a set screw for clamping the parts together, said bar being threaded, and a clamp nut at each end of the yoke for retaining the yoke against lateral movement on the bar.

3. The combination with a slotted bracket, of a bar having a flattened portion fitted in the slotted bracket, and an abutment on the bar, a clamp nut on the bar for holding the bracket to the bar, a battery casing suspended from the bar, and a lamp supported from the casing.

4. The combination with a bracket and a bar for a lamp, of a yoke on the bar adapted to fit over the bracket, means for clamping the yoke, bracket, and bar together, a hook formed at the end of the bracket engaging the yoke, and means for clamping the yoke against lateral movement on the bar.

In testimony whereof I affix my signature.

NICHOLAS WATT SHIPP.